(12) United States Patent　(10) Patent No.:　US 9,112,361 B2
Schumm, Jr.　(45) Date of Patent:　Aug. 18, 2015

(54) COMBINATION AND MODIFIED ELECTROLYTE TO REDUCE RISK OF PREMATURE LITHIUM ION BATTERY FAILURE, INCLUDING IN AIRCRAFT APPLICATIONS

(71) Applicant: Brooke Schumm, Jr., Ellicott City, MD (US)

(72) Inventor: Brooke Schumm, Jr., Ellicott City, MD (US)

( * ) Notice: Subject to any disclaimer, the term of this patent is extended or adjusted under 35 U.S.C. 154(b) by 0 days.

(21) Appl. No.: 14/116,156

(22) PCT Filed: Mar. 15, 2013

(86) PCT No.: PCT/US2013/032602
§ 371 (c)(1),
(2) Date: Nov. 7, 2013

(87) PCT Pub. No.: WO2014/133560
PCT Pub. Date: Sep. 4, 2014

(65) Prior Publication Data
US 2014/0239918 A1　Aug. 28, 2014

Related U.S. Application Data

(60) Provisional application No. 61/771,023, filed on Feb. 28, 2013.

(51) Int. Cl.
*H02J 7/00*　(2006.01)
(52) U.S. Cl.
CPC ............... *H02J 7/0026* (2013.01); *H02J 7/007* (2013.01); *H02J 2007/0037* (2013.01)
(58) Field of Classification Search
CPC . H01M 10/056; H01M 10/057; H02J 7/0091; Y02E 60/12
USPC ............................................................ 320/152
See application file for complete search history.

(56) References Cited

U.S. PATENT DOCUMENTS

| | | | | |
|---|---|---|---|---|
| 2,900,434 A | * | 8/1959 | Zimmerman et al. | ......... 429/166 |
| 2,904,437 A | * | 9/1959 | Czarnetzky | ..................... 426/10 |
| 2,971,044 A | * | 2/1961 | Zimmerman et al. | ......... 429/166 |
| 3,904,437 A | * | 9/1975 | Specker | ........................ 429/199 |

(Continued)

FOREIGN PATENT DOCUMENTS

WO　WO 2011-152062 A1　12/2011

*Primary Examiner* — Richard Isla Rodas
*Assistant Examiner* — Michael Dibenedetto
(74) *Attorney, Agent, or Firm* — Brooke Schumm, III; Daneker, McIntire, Schumm, Prince, Manning & Widmann, P.C.

(57) ABSTRACT

A combined system reinforces the safety of lithium ion batteries by redesign of electrolyte and the charging current a) modifying the electrolyte to inhibit or prevent dendrite growth preferably by the addition of lithiated polyphenoxy polyethylene glycol and/or a second surface active compound chosen from the family of fluorosurfactants, and/or a modest amount of lithium or sodium borate, b) modifying the charging cycle by a so-called ripple current in order to inhibit or prevent dendrite growth (ripple current meaning oscillation in the amount of amperage or voltage in the charging cycle), c) programmable battery management systems with temperature and electrical limits integrated in order to eliminate from the circuit and bypass malfunctioning cells based on past performance of the charging cycle and voltage endpoints achieved, d) minimizing any transient currents and voltages into or out of the battery system and e) maintaining a cool atmosphere in the battery space.

5 Claims, 5 Drawing Sheets

(56) References Cited

U.S. PATENT DOCUMENTS

| | | | |
|---|---|---|---|
| 4,192,727 A * | 3/1980 | Ward | 521/50.5 |
| 5,367,244 A * | 11/1994 | Rose et al. | 320/141 |
| 5,494,762 A | 2/1996 | Isoyama | |
| 6,664,004 B2 | 12/2003 | Krause | |
| 6,803,152 B2 | 10/2004 | Shembel | |
| 7,217,477 B2 | 5/2007 | Park | |
| 7,217,479 B2 | 5/2007 | Park | |
| 7,683,576 B2 | 3/2010 | Tien | |
| 7,901,813 B2 | 3/2011 | Park | |
| 8,258,755 B2 * | 9/2012 | Yang | 320/139 |
| 2008/0241699 A1 | 10/2008 | Halalay | |
| 2009/0107743 A1 | 4/2009 | Alston | |
| 2011/0057621 A1 * | 3/2011 | Hong | 320/134 |
| 2011/0226559 A1 * | 9/2011 | Chen et al. | 187/290 |

* cited by examiner

COMBINATION AND MODIFIED ELECTROLYTE TO REDUCE RISK OF PREMATURE LITHIUM ION BATTERY FAILURE, INCLUDING IN AIRCRAFT APPLICATIONS

CONTINUATION DATA

This application claims benefit of U.S. Provisional Application 61/771,023 filed Feb. 28, 2013.

TECHNICAL FIELD

The technical field relates to creating a combination system to minimize electrical stress on lithium batteries and their included cells by a novel combination of electrical system stabilization, modification of the chemical composition of the electrolyte, and modification of the charging cycle and charging current for use of these batteries and cells in aircraft, automobiles and appliances.

BACKGROUND ART

There has been a long-felt need, made more glaring by recent events involving Boeing 787 aircraft that the control of batteries or cells using lithium ion reactions (including in the term of "lithium ion battery" or "lithium ion cell," the general class of batteries or cells relying on lithium metal electrodes) must include control of their many facets including environment, charging voltage and amperage and battery temperature, primarily involving cooling, and the cell's absolute voltage. All of these may be necessary to provide an adequate degree of safety for the use of lithium ion cells and battery packs in relatively large sizes for consumer and industrial use, particularly in aircraft. Lithium cells have appeared to hold great promise because of their high energy density, but the technical problems with overheating, particularly as a result of overcharging, have limited their success in large energy applications. While the Boeing 787 problems have occupied the headlines, there have been other reports over a number of years of adverse consequences in automobiles and other appliances. Aircraft provide the most extreme examples of the potentially terrible consequences of catastrophic failure. Recently, an airliner in Japan had a lithium cell malfunction and was able to land safely because it was near or over Japan—posit that situation on a Great Circle route in northern latitudes or over long trans-ocean routes and an uncontrolled fire or catastrophic failure in the electrical system is less likely to end safely for passengers and crew. Similarly, in appliances such as automobiles, a failure in adverse weather conditions such as winter, or in remote or desert areas can have life-threatening consequences even if the vehicle can be exited safely.

SUMMARY OF INVENTION

Technical Problem

Lithium ion cells cannot be overcharged safely. Upon overcharging, the probability is extremely high that any number of adverse effects will occur. These often include a self-synergistic effect of reaction of lithium with other battery components, and the resultant heat triggering further reactions of the battery with other battery components resulting in an uncontrolled or runaway reaction. Lithium, particularly once heated, is highly reactive. At 79 degrees C., Lithium has a strong propensity to react with some electrolytes; in particular, 79 degrees C. appears to be the temperature for the activation energy of the reaction of Lithium with common electrolytes such as ethyl carbonate or polypropylene carbonate. Once the reaction has begun, unexpected venting, heat, fire and explosions are typical results. Once a runaway reaction has begun, lithium and its reactants react with water and a number of other fire suppressants thus complicating efforts to slow or stop the reaction, particularly by firefighters. A faulty lithium battery after ignition, does not need oxygen in order to sustain its undesired reactions. Complicating the problem in Lithium batteries is that to achieve the high energy outputs needed, multiple cells in each battery are often needed. It is difficult to make every cell exactly like every other cell from a cell or battery assembly line. Thus particularly robust measures must be in place to assure the proper charging of every cell either alone or in a battery containing multiple cells.

The technical literature emphasizes the need to have a very high degree of precision in the assembly of lithium ion cell parts, as much or more as for any other type of primary or rechargeable cell. There can be no cracks in electrode coatings, no flaws in separator layers and impurity control to a vanishing point in all active materials. It is critical that the desirable relative initial capacity of each electrode be determined by experiment during battery development period to find the safest pairing of each set of positive and negative electrodes. Notwithstanding those aspirations, inevitably, variations in manufacture and individual cell characteristics occur. Accordingly, batteries, particularly large ones, (e.g. >8 Ampere hours) must have complex battery management systems to assure no battery or cell abuse occurs under unexpected conditions and that cells and batteries shut down upon excessive heating. Preferentially any failing cell or battery must be identified automatically and electrically removed from the circuit. In order to meet power requirements and minimize cable weights and resistance, the batteries and cells are preferably placed in a series arrangement. Exceptional diode or other protection must be provided between parallel circuits or undesirable imbalances will occur between the battery circuits leading to overcharging, heating and cell failures in an unacceptable percentage of applications.

As is emerging in the news, lithium ion batteries can be plagued by dendritic growth during recharging, either in trees that grow from the positive electrode (typically a graphite material to the negative electrode (typically a lithiated metal phosphate or a mixed metal oxide). and short out the cell during recharging, or by the growth of "mossy lithium" during recharging which, while not immediately shorting out the cell, interferes with the appropriate discharge of the cell and shortens its operating life during a discharge cycle, and may develop into dendrites. After less than a commercially practical number of cycles, the cell either does finally short out or does not operate in a practical way. While superficially the idea of adding anti-dendritic agents may seem appealing, based on experimental results, it turns out that the addition of dendrite inhibitors is often accompanied by increased resistance and enhanced electrolyte leakage. This problem is exaggerated by repeated discharge and recharge of the battery. Moreover, as resistance increases, and measurement is being taken of cell voltage, the resistance would vary by cell placement within the battery, and the observed phenomenon under the laws of physics would be that the amperage heating ($I^2R$ heating) would be locally increased if higher resistance was present. This would change the optimal charging voltage. Repeated cycling of the cells in a battery would exaggerate the differences among cells. This effect can lead to undercharging some cells and overcharging others, but with the constant current flow present throughout the battery for a given charging voltage, there could be in some other cells a different locally higher voltage, resulting in localized overcharge conditions. These condition in turn change the chemical behavior of the graphite in the negative electrode which may contribute to lithium dendrite growth, with heating and ultimately, catastrophic failure.

Solution to Problem

A combined system is proposed in this invention herein to reinforce the safety in and around lithium ion batteries and other high power electrochemical power sources with a focus on specific controls to prevent temperature increase and battery malfunction by a) modifying the electrolyte to inhibit or prevent dendrite growth preferably by the addition of lithiated para hydroxy-diphenyl polyethylene oxide also sometime known as lithiated polyphenoxy polyethylene glycol [lithiated para diphenyl phenoxy polypropylene glycol] and/or a second surface active compound chosen from the family of fluorosurfactants, and/or a modest amount of lithium or sodium borate, b) modifying the charging cycle by a so-called ripple current in order to inhibit or prevent dendrite growth (ripple current meaning oscillation in the amount of amperage or voltage in the charging cycle), c) maintaining and designing programmable battery management systems with temperature and electrical measurements and limits integrated in order to eliminate from the circuit and bypass any cells that are not within safe parameters, particularly based on past performance of the charging cycle and voltage endpoints achieved, d) minimizing any transient currents and voltages upon application of power, drawing of power or transition of power into or out of the battery system to insure that no cell abuse occurs under unexpected conditions, and e) maintaining a cool ambient atmosphere in the battery space. (note problem of aircraft on tarmac)

Thus, batteries, particularly large ones, (e.g. >8 Ampere hours) must have complex battery management systems to assure no cell abuse occurs under unexpected conditions and that cells and batteries shut down upon excessive heating. Preferentially any failing cell must be identified automatically and electrically removed from the circuit. Another design characteristic is that the batteries should be placed in a series arrangement. Exceptional diode or other protection must be provided between parallel circuits or undesirable imbalances will occur between the battery circuits leading to overcharging, heating and cell failures in an unacceptable percentage of appliance applications.

Advantageous Effects of Invention

The invention provides a combination system and means for preventing the overcharging and catastrophic failure of a lithium battery system. In particular the invention is directed to minimizing and inhibiting the formation of dendrites and inhibition of penetration of the separator or space between the electrodes of the battery in any other way.

DESCRIPTION OF FIGURES

FIG. 1B shows the principle of the ripple current with the grid lines showing that for a sinusoidal ripple current, the voltage sinusoidally varies inversely from the amperage according to the standard equation Amperage times Resistance=Voltage. The curves in the FIGS. 1A and 1B based on curves selected from FIG. 16.55 of Reddy T (ed.)., Linden's Handbook of Batteries ($4^{th}$ ed.) published in year 2011 by McGraw-Hill (hereafter "Linden").

FIG. 2 shows the cooling system with a pump and heat exchanger and is based on the battery of cells shown in FIG. 26.44 of the Lithium-Ion Batteries chapter of Linden with intercell space for cooling fluid to pass through.

DESCRIPTION AND EMBODIMENTS

Definitions

Wherever the term battery is used, it includes a collection of cells typically referred to as a battery, or refers to a particular cell. A person of ordinary skill in the battery arts can recognize where the description is equally applicable to a cell and where the design refers to a cell, and how it can be integrated with a battery.

Although at the time of filing the news is focused on the Boeing 787, the invention is applicable to battery systems for aircraft, automobiles, vehicles more generally, and many appliances requiring high energy density batteries. Wherever an application is referenced as to any one of an airplane, aircraft, automobile, or appliance, for instance, it should be understood that it is equally applicable to any one of other of the group of aircraft, airplanes, automobiles, vehicles more generally, or appliances, but only one of them is likely to be referenced for brevity sake.

As stated, batteries using lithium ion reactions are generally referred to as lithium batteries or lithium cells. In this invention, batteries or cells using lithium ion reactions or referring to lithium batteries or cells are intended to include in the term of "lithium ion battery" or "lithium ion cell," the general class of batteries or cells relying on lithium metal electrodes. The typical application being addressed and modified and controlled according to this invention will be a lithium ion cell with a positive electrode (typically a graphite material) with a lithiated phosphate or mixed metal oxide negative electrode, and non aqueous electrolyte usually consisting of an organic carbonate liquid or gel solvent plus a lithium salt.

The most novel element of the novel combination is the novel composition of the electrolyte in combination with the ripple current next described. The intent of the invention is not merely to control consequences of adverse events which seems to be the more current approach. Rather, the invention, in a novel way, in the first instance, inhibits the adverse events inside the cells which potentially give rise to the catastrophic events which must be controlled.

Experiments were conducted using zinc electrodes in a zinc chloride and ammonium chloride electrolyte in order to establish the principles of this invention. First, tests were run with a ripple current. That generated extensive mossy zinc, particularly at the edges of the zinc electrode. The mossy zinc formed in these tests displayed tiny bubbles indicating an active zinc surface. The active surface with tiny bubbles indicated the presence of hydrogen likely because of the hydrogen overvoltage. This suggested this was not a desirable solution. Then, PPPG was added to the electrolyte and the ripple current was continued. The zinc dendrite growth continued but turned into needle-like crystals extending to the opposite electrode. This was not a desirable result and suggested that PPPG was not a desired solution and that PPPG combined with a ripple current was not a desired solution. In these cases, extensive deposits of mossy zinc or needle-like crystals of zinc as described were formed that were oriented to the opposite electrode and were long enough to penetrate a typical separator.

Notwithstanding those results, now the inventor combined the PPPG, and the ripple current and then a mixture of molar equivalents of purified anhydrous calcium oxide (CaO) (>99% purity) and USP boric acid were added to the electrolyte. Upon application of the ripple charging current, the needles/mossy zinc did not appear and a nearly smooth and sort of low profile irregular surface was created. This created the dramatic result of no dendrites in the form of mossy trees or long needles erupting from the zinc, thus eliminating the risk of shorting out the battery. Attempting to use the CaO and the boric acid alone did not achieve a favorable result.

Because the properties of PPPG are similar to those of fluorosurfactants, they can be used as additional additives that would be more stable in the lithium battery environment and could be combined with or substituted for the PPPG.

The inventor attempted to use a smoother current and more sophisticated supply to prove that the agents alone were sufficient, but that turned out not to be the case and again mossy zinc formation was observed. Removing the ripple of the charging current negated the influence of the additives.

The zinc electrode experiments are a reasonable proxy for the determination of modifications applicable for lithium batteries.

Lithium borate can substitute for CaO and boric acid. Adding calcium borate created separately did not work as well as adding CaO and boric acid together to the electrolyte.

One aspect of the invention is that the standard Li ion battery electrolyte is proposed include at least one of the following three types of components.

The preferred mode of invention is to include in the electrolyte a lithiated polyphenoxy polyethylene glycol (LiPPPG). The PPPG can be made by the addition of thirteen equivalents of ethylene oxide with one equivalent of parahydroxyphenyl. The nominal structure of PPPG is This is referenced in Zimmerman et al, U.S. Pat. No. 2,900,434. Upon lithiation by lithium hydroxide, the lithium is substituted for the hydrogen in the end hydroxyl group.

Also included are similar compounds in the classes of polyoxyethylated polynuclear aromatic phenols, polyoxypropylated polynuclear aromatic phenols, and alkyl aryl phenols that can be lithiated to substitute for any active OH substituent that do not significantly vary from the chemical properties of the LiPPPG because they cause either less dendritic formation in this invention, or not more than 10% by volume of dendritic formation than by using PPPG or the proposed compounds below.

Similar compounds include Neutronyx-600, which is characterized as an alkylphenol polyglycol ether. This material is prepared by reacting approximately nine and one-half moles of ethylene oxide with one mole of nonylphenol.

Other specific materials of the same general type which could be used are:
 (1) Polyglycol ether of 1-naphthol (containing 11 equivalents of ethylene oxide).
 (2) Polyglycol ether of 2-naphthol (containing 12 equivalents of ethylene oxide).
 (3) Polyglycol ethers of p-phenyl phenol (containing 6, 13, 15, 18 or 27 equivalents of ethylene oxide).
 (4) Polyglycol ether of triphenylmethanol (containing 14 equivalents of ethylene oxide).
 (5) Polyglycol ethers of nonylphenol (containing approximately 4, 6, 10, 11, 15, 30 or 40 equivalents of ethylene oxide).
 (6) Polyglycol ethers of octylphenol (containing approximately 3, 5, 7 or 9 equivalents of ethylene oxide).
 (7) Polyglycol ether of phenol (containing 8 equivalents of ethylene oxide).
 (8) Polyglycol ether of di(2-ethyl hexanol) (containing 13 equivalents of ethylene oxide).
 (9) Polyglycol ether of 2,6,8-trimethyl-4-nonyl (containing 8 equivalents of ethylene oxide).
 (10) Glycol ether of octylphenol (containing 1 equivalent of ethylene oxide).
 (11) Polyalkyl ether of dodecylphenol (containing 75 weight percent of mixed ethylene and propylene oxides).

Referring again to the general formula above, it is seen that R may stand for the residue of an initially hydroxylic compound.

The chain length of repeated segment in these compounds can be from 10-50 depending on the desired viscosity. Ethylene oxide is available from Sigma-Aldrich of St. Louis Mo. Parahydroxydiphenyl is sold as 4-Phenylphenol, product no. 13,434-1 sold by Sigma-Aldrich. Nonylphenol is available from Sigma Aldrich, Inc.

All of this list of compounds are referred to as the "PPPG Group" for purposes of the claims, including in that PPPG Group, therefore, PPPG, Neutronyx-600 and items 1-11 in the preceding paragraphs, and the compounds described in Zimmer '434 in its specification or claims.

PPPG and the members of the PPPG Group can be lithiated by reaction with Lithium hydroxide. Upon lithiation by lithium hydroxide, the lithium is substitute for the hydrogen in the end hydroxyl group. This lithiated PPPG or any other suitable lithiated polyoxyethylated polynuclear aromatic phenols, polyoxypropylated polynuclear aromatic phenols, or alkyl aryl phenols should then be anhydrous, meaning having less than or equal to 0.1% water before being included in the electrolyte, and preferably even less than 0.1% water. The carbons of the polyoxy chain length in the PPPG Group in general affect the viscosity and can be adjusted as needed to the particular electrolyte. Normally a chain of between 10 and 50 is sufficient and optimal.

Lithium hydroxide is available from major chemical sellers such as Sigma-Aldrich of St. Louis, Mo.

In this preferred mode, a second component is added, although it could be used less optimally alone: a fluorosurfactant, particularly those manufactured by 3M Corporation of Minneapolis/St. Paul, Minn., or from the GAFAC® family of chemicals manufactured by HBC Chemicals of Shenzhen, China (CAS No. 12674-35-0-Chemical Name: GAFAC RA-600 also known as GAFAC RA-600; phosphoric acid, ethoxylated C8-12 alkyl alcohols esters). Fluorosurfactants that would function as this second component are also available from DuPont Corporation of Wilmington, Del. Another alternative for this second component is a sulfonamide or sulfonimide electrolyte for lithium battery applications available from 3M Corporation. For instance, a proposed sulfonimide electrolyte is 3M Fluorad® Battery Electrolyte HQ-115 sold by 3M Corporation, also known as Lithium-bis-(trifluoromethane-sulfonyl)imide. The recommended percentage in this invention is less than 5%.

In this preferred mode a third component is added, although it could be used alone: Anhydrous Lithium Borate ($Li_3BO_3$) or sodium borate in a concentration of 0.1 wt % to 5.0 wt % and preferably between 0.1 wt % and 0.5 wt %. The lithium or sodium borate can be made by reacting the metal hydroxide desired with boric acid.

It is preferable to granulate and attempt to uniformly mix the LiPPPG, the fluorosurfactant, and the borate with the electrolyte before addition to the space among the electrodes.

Another mode of invention is to use only one or two of the above listed components in combination. For example, LiPPPG could be used in combination with a fluorosurfactant alone. A fluorosurfactant could be used with the sodium or lithium borate. The LiPPPG could be sued with the sodium or lithium borate.

Enhanced performance beyond that of either individual compound is achieved. Remarkable leveling and dendrite reduction or elimination is achieved, particularly and even after a number of discharge and recharge cycles.

Figure 1A:
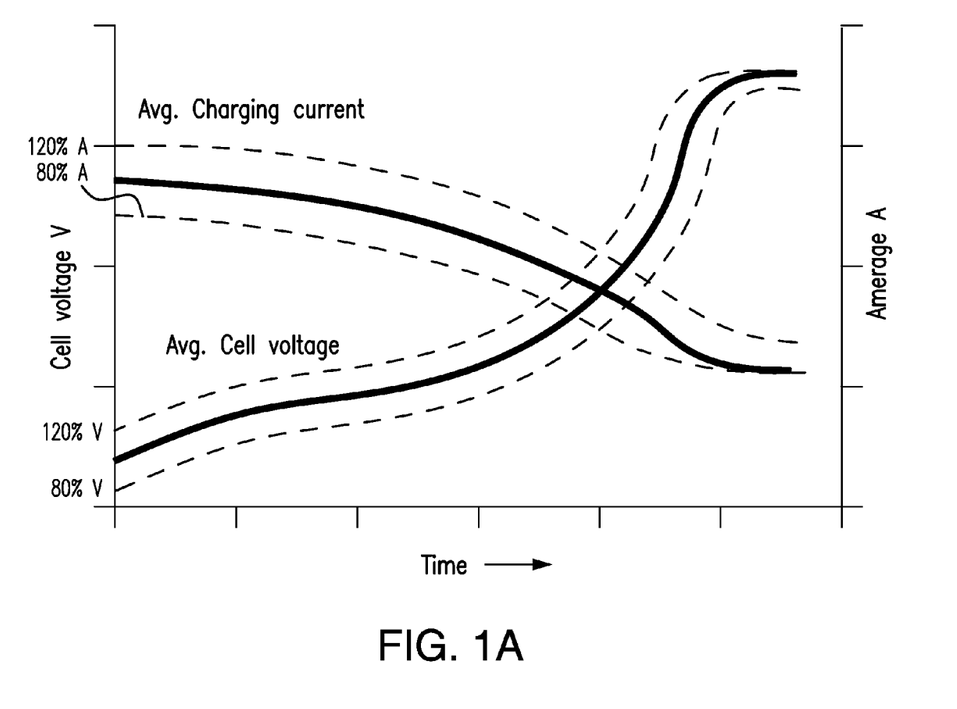
FIGS. 1A and 1B show the range of oscillating current and voltage.
Figure 1B:
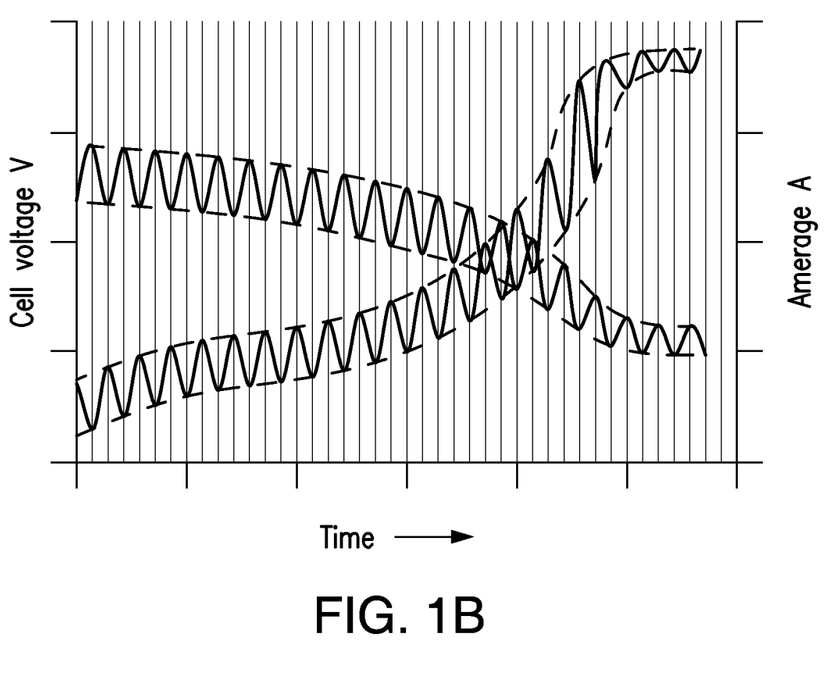
Figure 2:
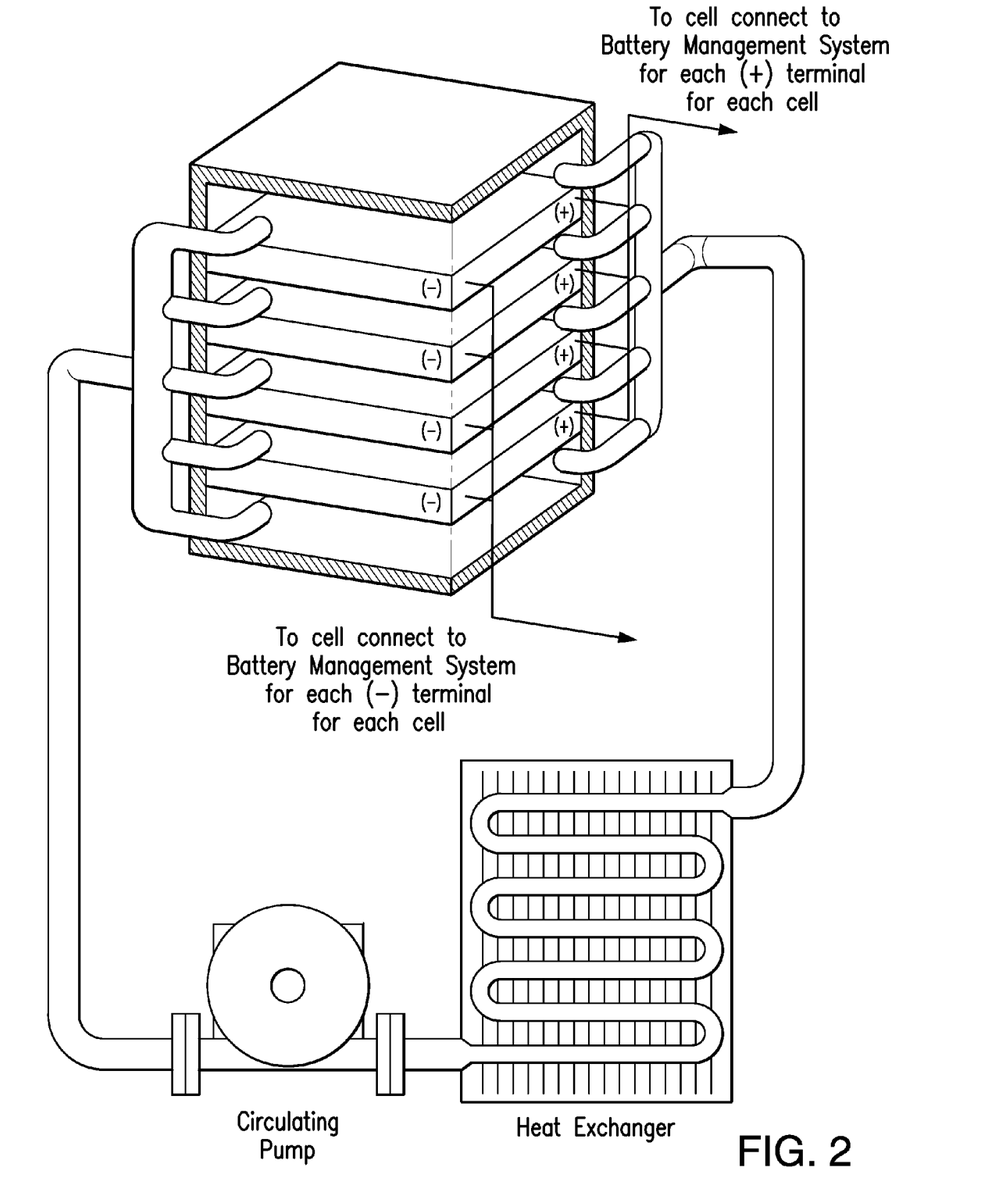
Figure 3:
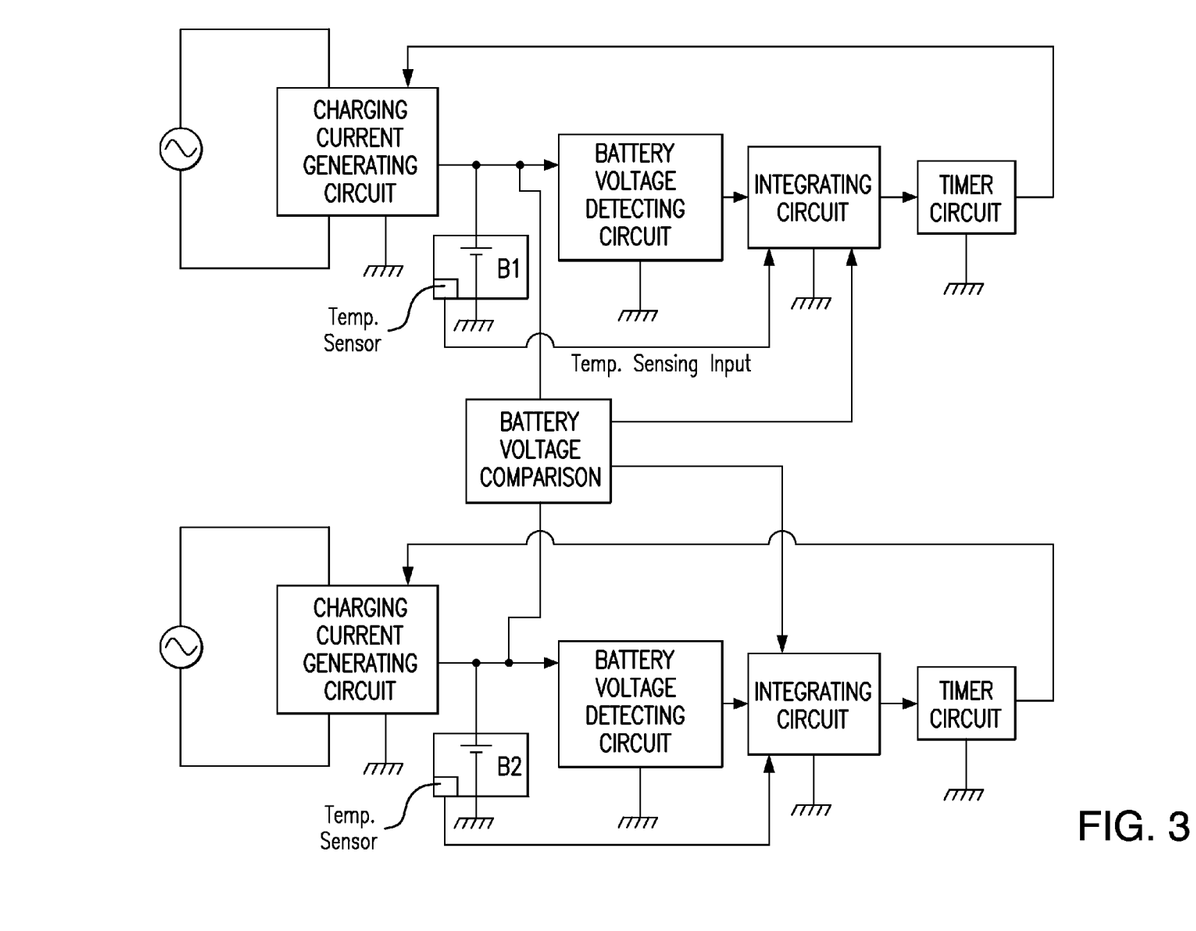
FIG. 3 shows a battery management system parroting drawings and principles taken from Tien, "Smart Lead-Acid Battery Charging/Discharging Management System," U.S. Pat. No. 7,683,576 issued Mar. 23, 2010, and Furukawa, "Quick Charging Circuit," U.S. Pat. No. 4,668,901, May 26, 1987, both have battery management systems with detailed diagrams. Chargers are thoroughly discussed in chapters 16.7.2 and Appendix H.28-H.30 of Linden.
Figure 4:
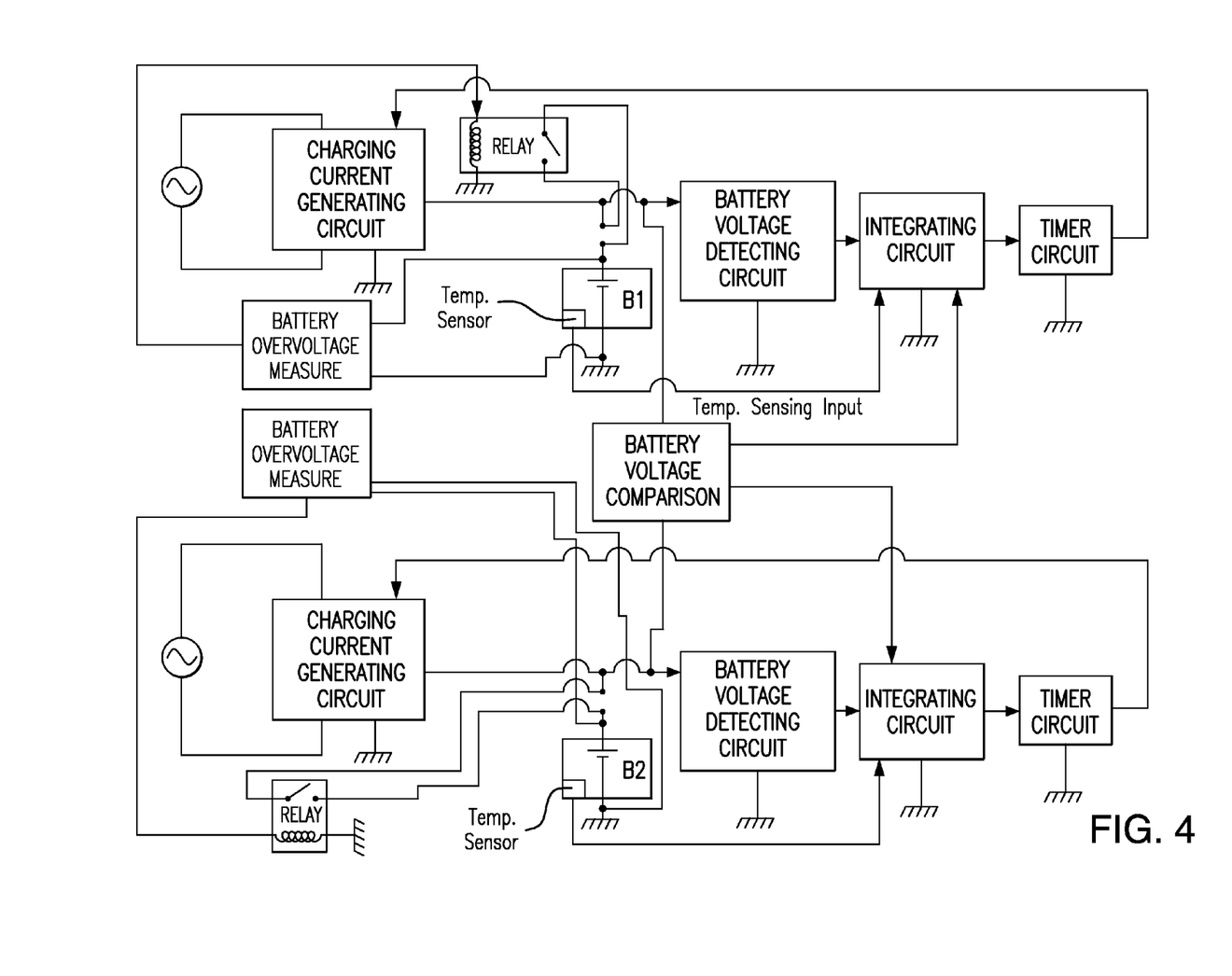
FIG. 4 is like FIG. 3 with the battery overvoltage feature and charging interruption in the event of overvoltage integrated into the battery management system in the same style as Furukawa,"Quick Charging Circuit," U.S. Pat. No. 4,668, 901, May 26, 1987.

The second critical element in this novel combination, after selection of at least one of the prior three chemical additives referenced above, and preferably all three, in order to achieve the success of the invention is to use a ripple effect in charging. Based on experiments conducted by the inventor, dendrite inhibition and stabilization of cells is optimized by using a ripple effect in charging. By modifying the charging cycle by a ripple effect of a ripple current or a ripple voltage, dendrite growth is inhibited or prevented in conjunction with at least one of the chemical additives referenced. Another way to describe the ripple effect is oscillation in the amount of amperage or voltage in the charging cycle. A ripple effect is defined for purposes of this invention as the optimal charging voltage (or current) varied by a wave characteristic of greater than 0% and below 30%, above and below the optimal DC charging voltage (or current). The variation in the optimal ripple effect can be greater than 0%, 5%, 10%, 15%, 20%, 25% or 30% or any increment in between. The preferred variation is 10-15%. The charge is intended to be tapered at the end of the charging cycle.

The voltage should be measured cell by cell and compared with the current which should be the same in any series of cells and any irregularity between the sales should be monitored and a determination made in the battery management system as to whether there is a malfunction.

The battery management system should be programmed cell by cell and battery by battery to accomplish parameters discussed below.

The typical effect of the optimal combination of electrical ripple current charge characteristics and the set of cooperating chemicals added to the lithium ion battery electrolyte is to control lithium metal deposition in a favorable way. Through the electrolyte chemistry and ripple current charging according to this invention, the effect is that formations that would be dendritic trees or mossy deposits are converted to vesicular characteristics (small bumps) and the tree like or mossy structures that could connect electrodes are inhibited. The effect of the invention in total combination with the prevention of overcharge therefore is to minimize and inhibit dendrites so that they do not form and penetrate the separator or bridge the space between the electrodes.

The invention is optimally used in conjunction in a temperature and humidity controlled environment for the battery system. In particular, high temperature, such as from a plane sitting on tarmac, or an automobile sitting on a hot asphalt street, can increase the temperature of the battery system to levels dangerously close to or above the activation energy of lithium and the electrolyte. The airplane, battery compartment, or appliance idle temperature should be below 80 degrees C., and preferably below 45 degrees C. and the actual battery operating environment should be kept to preferably between 19 and 23 degrees C. in order to insure not only the satisfactory battery performance but the accurate operation of all supporting electrical systems, and sensing systems. The ambient temperature, less preferably, may be 70, 60 or 50 degrees C. It is desirable though somewhat less essential to control the humidity in order to prevent condensation on the battery and system wiring when cooling is applied.

The invention is not specifically directed to high energy cells (>8 amps) but for cost reasons is most practical in those applications.

A suitable battery management system is needed in the invention. The parameters of what it should achieve are discussed in the context of a system that should be able to be functional to achieve the goals of safety in the invention. Texas Instruments, Inc. of 12500 TI Blvd., Dallas, Tex. 75243 USA makes a proven Battery Management System (BMS). For instance the MSP430™ 16 bit ultra low power multi-cell lithium ion battery management system displays desirable characteristics and reasonably skilled practitioner can integrate the battery management system to the cells and batteries by means of thermocouples and voltage regulators and operating amplifiers to convey the signals to the management system to enable management of the batteries and cells and in particular manage the circuitry to eliminate cells or batteries that are not functioning in an optimal manner. The system is described as:

"This application report explains the implementation of a multi-cell lithium-ion battery management system using an MSP430™ microcontroller and the bq76PL536. The battery manager is implemented using the standard evaluation boards for the MSP430 MCU and the bq76PL536. The bq76PL536 can be stacked vertically to monitor up to 192 cells without additional isolation components between ICs. A high-speed serial peripheral interface (SPI) bus operates between each bq76PL536 and the MSP430 microcontroller to provide reliable communications through a high-voltage battery cell stack. The battery management system can communicate with an external host or battery charger using USB communication or asynchronous serial communication such as RS232 or RS485. This application report demonstrates the following features: passive cell balancing, cell undervoltage monitor, cell overvoltage monitor, safety cell overvoltage monitor, cell overtemperature monitor. It also detects whether the battery system is in charge or discharge mode by detecting changes of cell voltages."

For this invention, the preferred battery management system should have software and hardware which contains a tested charge and discharge control algorithm which calculates the optimal battery end of DC charge voltage and current based on the average of the previous one to five cycle endpoints, preferably three, once the sixth discharge cycle is complete in the cycle life of the battery of one or more cells. This action accounts for lower desirable endpoints (fade) as the battery cycle life increases and decreases the probability of overcharge. A method of accomplishing this can also depend on a technique called overflow charging where the charge current has dropped to low levels during the period close to the end-of-charge point. In overflow charging the charge current is interrupted and the open circuit voltage of each cell is measured to determine how close it is to the end of charge point. (3) If one or more cells in a battery has such an endpoint that falls more than 100 millivolts below the average of the other cells in the battery it should be disconnected electrically from the two or more other cells in the set and the load cycle. The BMS must also synchronize the AC output voltage of the system with the existing AC voltage and current, if any, in the system powered by the battery.

A suitable battery management system can be provided using the materials and methods of Tien, U.S. Pat. No. 7,683,576, Mar. 23, 2010 entitled "Smart Lead Acid Battery Charging/Discharging Management System." While that system is focused on lead acid batteries, the same principles apply to the battery management system and its characteristics for this invention.

Another problem for lithium batteries seen in any power or recharge hookup (and perhaps disconnect) is the sudden application of power and uncontrolled transient voltage and current. In this invention, it is proposed that the battery management system additionally be assisted by a voltage conditioner for AC input voltage to the battery system prior to converting the AC voltage to a selected DC voltage, by a DC voltage controller, and by a DC charge current manager as described before to establish the ripple current and prevent overvoltage and over current. If necessary, power diodes, inductors and capacitors are needed to suppress unwanted transients and protect the batteries.

Additionally, when a cell is cut out of the system, control of the transient between two parallel battery systems must occur. While lithium batteries in series pose few issues when operating normally, when there are two systems or more in parallel, there can be transient voltage or current issues when a cell is cut out or when the operating characteristics are different.

For instance, in an aircraft, but also in automobiles, when an external power system is disconnected from an aircraft, there is an immediate load placed on the internal power supply system. It has been observed in passenger aircraft that the passenger cabin lights sometimes go out momentarily when switching from one power source to another. Disturbances, especially in DC voltage situations, can be hard to completely control, and in connection with these disturbances, these high power batteries and their interaction with outside power supplies and electrical disturbances, must be controlled. If systems are operated simultaneously, the outputs must be synchronized, particularly in an alternating current system. There are large capacitors available to inhibit voltage spikes. Capacitors or devices with capacitor-lie effects that preclude instantaneous voltage change consistent with classic electric principles that may be used to protect against large voltage surges are available. An example is from Delta Lightning Arrestors described below which would be connected across the terminals of the battery or cells to prevent an instantaneous spike of voltage. In addition, amperage can be smoothed by an inductor which also prevents an instantaneous spike of current which, because of the internal resistance of a battery, might cause a spike of voltage. Capacitors are temperature-dependent and so must tolerate a temperature above the desired lithium battery temperatures, which as stated should be less than or equal to 60 degree C. The capacitor must tolerate the imposed voltage because once the dielectric gap is overcome, the capacitor functions as an open wire with minimal resistance. An inductor must tolerate the anticipated amperage. Examples of large power inductors available are from Vishay Intertechnology, Inc. of Malvern, Pa. Large scale capacitors would be ones of the type exemplified by the design of the CA-302R Surge Protector capacitor available from Delta Lightning Arrestors, Inc. of Houston Tex. for DC applications, wired across the voltage potential to be controlled. For AC applications, the LA-302 class by Delta is connected across the AC poles with a third wire to ground to protect against surges of AC voltage. Certain of these are designed in an overvoltage situation to melt to protect the circuit and must be situated so that any contents ejected or any melting is not interior to a battery. There are a variety of voltage regulators available on the market that can maintain the operating parameters of a selected battery or cell voltage and load.

As part of the battery management, the battery management system must contain one or more thermocouples to detect temperature in or on each cell and be programmed and hardware assisted to disconnect the cell from the electrical system if the cell temperature exceeds planned 60° C. limits. A so-called operating amplifier which detects overvoltage variations can be and should be utilized cell by cell to provide input to the system to detect and cut out any cell which is close to being over-voltage. If lithium metal exists in the system it may react with the electrolyte at about 79° C. Any surrounding cooling fluid in contact with the cell surface must also not vaporize significantly at this temperature. A suitable indication of such cut-out is appropriate. However, under the design proposed herein, so long as there is no over-temperature indication, the cutout of the cells and inhibition of dendrites should be sufficient to enable the appliance to continue to operate provided adequate power is present. An alarm to indicate that the appliance is approaching inadequate power provision would indicate that emergency procedures be initiated before any catastrophic loss of power or catastrophic battery failure occurs.

Voltage regulators are commercially available to control transients during any change from recharging to discharging, discharging to recharging, and application of additional power systems inputting power into the battery system or drawing power from said system. In addition, for batteries in parallel with batteries in that parallel system having cells in series, upon the cutout of a cell because of malfunction, a transient restabilization of the system should be controlled by a voltage regulator as the two parallel batteries will be at different voltages and one system will tend to discharge into the other. The voltage regulator should also protect against voltage surges from lightning strikes or solar flares.

The battery management system should be located exterior to the casing for the batteries to protect the control system in the case of overheating or undesired chemical reactions in the batteries.

The battery management system, upon malfunction of a cell, preferably ceases any charging cycle unless a manual override is triggered in order to avoid an overcharge situation, or a situation where upon the cutout of the cell, the applied charge voltage now causes an increased amperage flow through the cells being recharged resulting in at least a transient overvoltage situation.

A further integration in the design to protect the aircraft or appliance or other device is to create an inter-cell space design within a battery case which depends on convection, a micro liquid pump or air pump driven circulation or heat absorption to delay or prevent unexpected heating of cells. A non-flammable liquid is preferred, and a liquid with a flash point above that of a heated lithium battery is preferred.

The inventor proposes two modes to accomplish the inter-cell space design. The first is a liquid fill between cells of a non-electrically conductive high boiling liquid such as a polysiloxane with high temperature resistance and very low vapor pressure. This would be a heat transfer fluid. The temperature of the liquid would be monitored and have a limit of 60 degrees C. designed to convey adequate time for a temperature warning by a thermocouple or heat sensor connected to an alarm. There are a variety of non-electrically-conducting products on the market to accomplish this liquid fill. A suitable product would be SYLTHERM 800® heat transfer fluid sold by The Dow Corporation of Midland, Mich.

A second mode is a non-electrically conductive molten salt or wax as a heat transfer fluid which would absorb substantial amounts of heat upon heating past a chosen melting point to delay or eliminate sudden temperature rises inside the battery compartment and convey adequate time for a temperature warning by a thermocouple or heat sensor set at 60 degrees C. connected to an alarm. That alarm could be at 80 degrees C., 75 degrees C., 70 degrees C. or 65 degrees C., or a lower number in increments of 5 degrees, but is most preferably at 60 degrees C. The liquid phase could also conduct heat to an exterior means of heat transfer. That exterior means of heat transfer can be connected to a heat exchanger and/or an emergency cooling system of liquid nitrogen to more quickly draw heat from the heat transfer fluid.

In order to maintain the cooling another mode of the invention is to include a design for the air conditioned battery space that includes a means of heat transfer from the interior of any multiple cell battery arrangement to an exterior heat transfer surface such as a fin or radiator. This could be one or more of the following elements:

A. A metal plate or foil insulated from electrical contact to cells by a heat conductive (but not electrical conductive) film preferably a high melting point polymer.

B. A thin loop heat pipe or tube array insulated from electrical contact to cells by a thin heat conductive (but not electrical conductive) layer preferably a high melting point polymer.

This portion of the system would also have a thermocouple or heat sensor set at 60 degrees C. connected to an alarm to enable adequate time for a high temperature warning before a danger level was reached.

While it may appear desirable to use an aluminum case for weight reasons, aluminum unfortunately will autoignite at a temperature of approximately 760 degrees C. That temperature can be exceeded readily by a runaway or uncontrolled reaction inside a lithium cell. Lithium will autoignite in air at approximately 179 degrees C., generating tremendous heat of combustion in the range of −298 J/(kg/K). Put another way, for small cobalt oxide lithium cells, the energy generated is approximately 100-150 kJ per amp-hour of capacity. It is noted that "a pallet of 10,000 2 Ah capacity 18650 cells (approximately 20,000 amp-hours of capacity) would contain 2-3 gigaJoules of energy from the cells alone." Mikolajczak, Celina P E, et al, "Lithium-Ion Batteries Hazard and Use Assessment," prepared for The Fire Protection Research Foundation (National Fire Protection Association, Quincy, Mass. 2011) at page 90. Thus steel is the preferred casing material because it has a higher modulus and higher flashpoint than aluminum. More preferable is stainless steel because it is resistant to electrolyte damage. There are also high temperature, high-modulus materials such as carbon-fiber reinforced polyetheretherketone (PEEK) that can be used. A solid steel casing with the battery management system exterior to the steel casing provides a weight-efficient high modulus system to protect against catastrophic failure.

It is desirable to minimize the number of different metals as to which galvanic action can occur with respect to the lithium battery. Since the wiring is usually copper, other than the battery itself, it is desirable to use only bronze or copper attachments to the battery terminals. If a steel case is used, brackets should either be non-conductive and the steel case insulated from the battery, or steps taken to minimize galvanic action between the battery(ies), wiring and steel case.

INDUSTRIAL APPLICABILITY

The industrial applicability is with respect to lithium ion batteries used in aircraft, airplanes, automobiles, vehicles more generally, and appliances.

The embodiments represented herein are only a few of the many embodiments and modifications that a practitioner reasonably skilled in the art could make or use. The invention is not limited to these embodiments. Alternative embodiments and modifications which would still be encompassed by the invention may be made by those skilled in the art, particularly in light of the foregoing teachings. Therefore, the claims are intended to cover any alternative embodiments, modifications or equivalents which may be included within the spirit and scope of the invention as claimed.

I claim:

1. A lithium battery system, including a lithium ion battery system, having a battery with at least one lithium electrode having at least one cell, and having electrolyte, comprising:

said electrolyte having at least one of a compound selected from the PPPG Group or selected from the group of fluorosurfactants;

said electrolyte having lithium borate, calcium borate, or having compounds added to said electrolyte having ions in molar equivalents to form at least one of lithium borate or calcium borate;

said battery having a charging cycle having a continuous oscillating ripple effect, said charging cycle having an optimal charge which has an optimal charging voltage or charging current during each portion of said charging cycle, said ripple effect having a charging cycle variance which varies at least the charging voltage or the charging amperage within a range of above 0% to not more than 30% of the optimal charge;

said charging cycle having a continuous oscillating ripple effect further having a battery management system to compare cell voltages intermittently with prior optimal charging voltages, and to compare cell voltages with each other to determine if any one cell varies by more than 100 mV from any other cell;

a battery management system having the capability to cut out cells exceeding designated parameters of temperature, voltage or amperage input into said battery management system.

2. The lithium battery system, according to claim 1 further comprising:

said lithium battery system having an integrated cooling system having heat transfer fluid, and a means for circulation of said heat transfer fluid.

3. The lithium battery system according to claim 1 further comprising;

said lithium battery system having polysiloxated fluid between batteries.

4. The lithium battery system according to claim 1 further comprising:

said lithium battery system having a means for voltage regulation upon load transition to and from said system, and having protection of any parallel battery circuit by said battery management system and said means for voltage regulation from cutout of any cell in any series of batteries connected to said parallel battery circuit.

5. The lithium battery system according to claim 1 further comprising;
a cooling system to maintain said lithium battery system at ambient temperatures under 80 degrees C.

* * * * *